US005509489A

United States Patent [19]

Lower, Jr.

[11] Patent Number: 5,509,489

[45] Date of Patent: Apr. 23, 1996

[54] FASTENER TOOL HANDLE ADAPTER

[76] Inventor: Henry C. Lower, Jr., 255 Harbor Ct., Winter Garden, Fla. 34787

[21] Appl. No.: 308,419

[22] Filed: Sep. 19, 1994

[51] Int. Cl.$^{6}$ ...................................................... B23B 45/04

[52] U.S. Cl. ........................... 173/170; 227/110; 227/156

[58] Field of Search ............................ 173/170; 227/107, 227/110, 119, 156

[56] References Cited

U.S. PATENT DOCUMENTS

| | | | |
|---|---|---|---|
| 3,272,267 | 9/1966 | Langas | 173/170 |
| 3,310,215 | 3/1967 | Bostick | 227/111 |
| 3,930,604 | 1/1976 | Pitkin, Jr. et al. | 227/110 X |
| 4,284,223 | 8/1981 | Salcido et al. | 227/5 |
| 4,436,235 | 3/1984 | Hebert | 227/111 |
| 4,479,599 | 10/1984 | Conrad | 227/9 |
| 4,627,563 | 12/1986 | Meyer | 227/156 X |
| 5,295,620 | 3/1994 | Cousineau et al. | 227/156 |

*Primary Examiner*—Richard K. Seidel
*Assistant Examiner*—Jay A. Stelacone
*Attorney, Agent, or Firm*—William M. Hobby, III

[57] ABSTRACT

A fastener tool handle adapter apparatus is removably attachable to a fastener tool, such as a pneumatic stapler or nailer. A handle adapter has an elongated arm having a handle on one end and a fastener tool attaching portion on the other end thereof. The tool attaching portion is shaped to fit over a fastener tool handle for attachment thereto with a plurality of attachment members. A pair of legs are positioned along the fastener tool firing head and shaped to shield the firing head. The elongated arm also has a trigger arm positioned to rotate a trigger pull member on one end thereof beneath the fastener tool trigger and to actuate the fastener tool by sliding the trigger arm and trigger pull member against the fastener tool trigger so that the fastener tool can be operated remotely. The handle adapter legs each have an aligning foot on one end thereof for aligning the fastener tool firing head.

9 Claims, 2 Drawing Sheets

FASTENER TOOL HANDLE ADAPTER

BACKGROUND OF THE INVENTION

The present invention relates to pneumatic operated fastener tools and especially to a fastener tool handle adapter which enables an operator to control the firing of the tool from a remote position.

Pneumatically operated fastening tools are widely used to drive heavy duty staples, T-nails and common nails. These tools are used in a large number of industries, such as construction, packaging, upholstering, and the like, and are primarily trigger controlled with the trigger located in the handle of the tool for ease of operation. These tools are very compact and relatively light in weight so that they are portable and can be conveniently transported by the operator to a construction site where the tools are used in nailing flooring, roofing, or other types of construction work. The tool is continuously moved along by the operator of the tool. The operator is required to move along on his knees or in some uncomfortable position or, alternatively, must continuously bend over while operating the tool which becomes very tiresome and dangerous in construction work.

In the past, a wide variety of extendable arms or handles have been suggested for the operation of staplers, nailers, or explosive type tools so that they may be remotely operated for a particular job. Typical prior U.S. patents may be seen in the Langas U.S. Pat. No. 3,272,267, for a Walking Stick for a Fastening Tool useful for installing floors and is a custom tool having an extension handle so that the operator may use the tool in a standing position. The Salcido et al. U.S. Pat. No. 4,284,223, is an extension for a pneumatic staple gun for use in stapling a ceiling and allows the tool to be held upright and actuated from below the ceiling. A similar ceiling tool may be seen in the Bostick U.S. Pat. No. 3,310,215, which is a custom ceiling stapling tool supported on a belt worn by a workman and operated with a mechanical advantage on an elongated lever arm actuating a staple forming mechanism forming staples from a continuous length of wire. In the Conrad U.S. Pat. No. 4,479,599, a Positioning and Firing Device for Explosive-Actuated Tools is also used for hanging ceiling. In the Cousineau et al. U.S. Pat. No. 5,295,620, an extendable arm is provided for a power and impact tool which enables the drilling of holes and installation of fasteners and ceilings directly by an operator standing on the floor below the ceiling. In the Hebert U.S. Pat. No. 4,436,235, a Portable Pneumatic Nail Driving Tool is provided for driving large nails being fed in a chute for use in the construction of board roads in swamps incident to oil field work. The tool rides on a wheel.

In contrast, the present fastener tool handle adapter is a removably attachable extension handle for a pneumatic stapler or nailer which has an elongated arm for remotely operating the tool for the installation of flooring, decking, or roofing and includes a pair of legs which act both as a shield for the firing head and as alignment and positioning members for the rapid operation of the tool. In addition, the trigger arm is such that it acts as a safety as well as a remote firing trigger mechanism.

SUMMARY OF THE INVENTION

A fastener tool handle adapter apparatus is removably attachable to a fastener tool, such as a pneumatic stapler or nailer. A handle adapter has an elongated arm having a handle on one end and a fastener tool handle attaching portion on the other end thereof. The tool attaching portion is shaped to fit over a fastener tool handle for attachment thereto with a plurality of attachment members. A pair of legs are positioned along the fastener tool firing head and shaped to shield the firing head. The elongated arm also has a trigger arm positioned to rotate a trigger pull member on one end thereof beneath the fastener tool trigger and to actuate the fastener tool by sliding the trigger arm and trigger pull member against the fastener tool trigger so that the fastener tool can be operated remotely. The handle adapter legs each have an aligning foot on one end thereof for aligning the fastener tool firing head.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1:
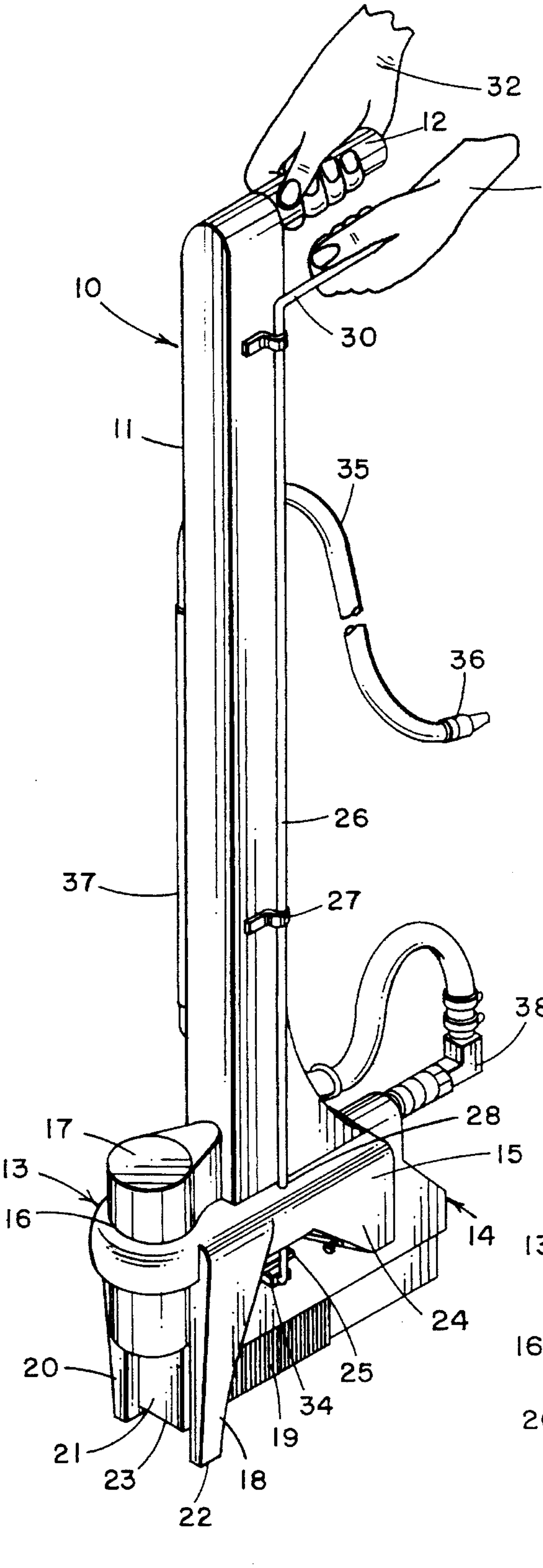
FIG. 1 is a perspective view of a fastener tool handle adapter in accordance with the present invention attached to a pneumatic stapler.
Figure 2:
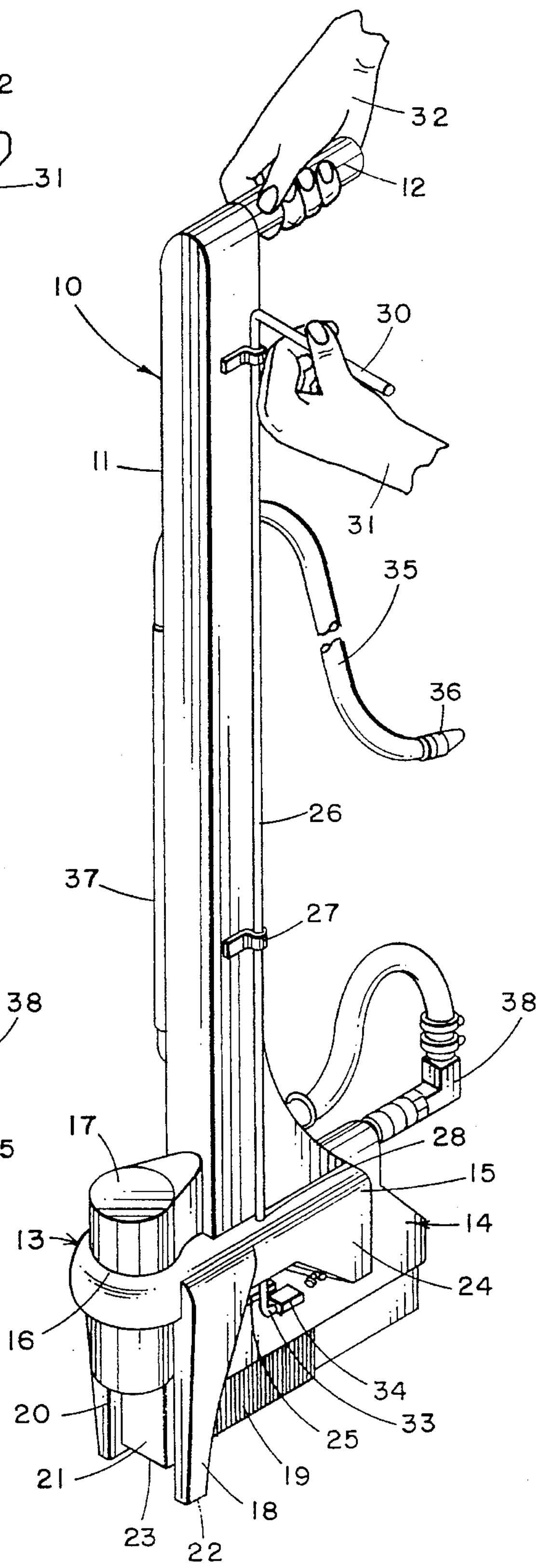
FIG. 2 is a perspective view of the fastener tool handle adapter of FIG. 1 having the trigger arm turned to a safety position.
Figure 3:
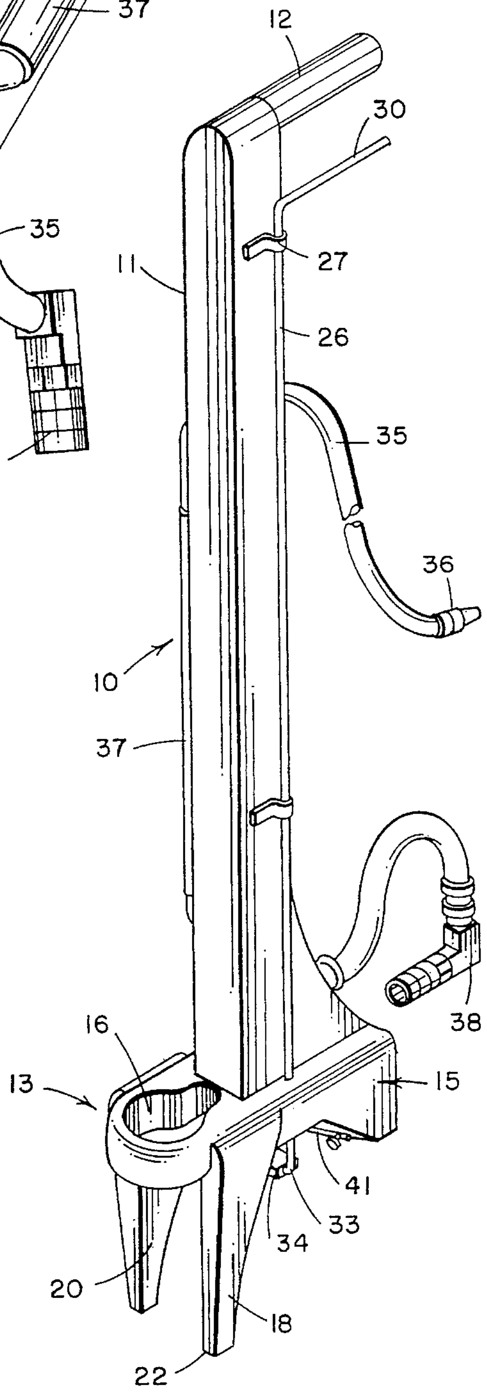
FIG. 3 is a perspective view of the fastener tool handle adapter of FIGS. 1 and 2 removed from the pneumatic stapler.

Referring to the drawings and especially to FIGS. 1–3, a fastener tool handle adapter 10 is provided with an elongated arm 11 having a handle 12 on one end thereof and a tool attaching portion 13 on the other end of the elongated arm 11. The pneumatic stapler 14 is shown attached to the handle adapter 10 and has a plurality of staples 19 therein and is attached to the tool attaching portion 13 which includes an adapter housing 15 having an opening 16 formed therein for fitting around the drive cylinder head 17. A pair of legs 18 and 20 extend along both sides of the firing head 21 of the stapler 14. Each leg 18 and 20 has an aligning and positioning foot 22 on the bottom thereof generally aligned with the bottom 23 of the firing head 21. The legs also act to prevent an operator from stapling his foot. In addition, the housing 15 has an extending portion 24 supporting the side of the tool 14 handle. The pneumatic stapler 14 has a handle covered by the housing 15 and has a trigger 25 under the handle so that when the handle is gripped, the trigger may be actuated with the same hand holding the handle of the stapler 14. The fastener tool handle adapter 10 has a trigger arm 26 supported with a pair of brackets 27 and passing through an aperture 28 in the housing 15 such that the trigger arm 26 can be both rotated and slid along the elongated arm 11. One end of the trigger arm 26 has a generally perpendicular handle 30 which can be gripped by one hand 31, as shown in FIGS. 1 and 2, while the handle is gripped by a second hand 32. The opposite end of the trigger arm 26 has a generally perpendicular trigger member 33 thereon having a trigger pad 34 attached thereto.

Rotation of the handle 30 rotates the trigger pad 34 from a safety position, as shown in FIG. 2, to a firing position, as shown in FIG. 1. In the firing position, the handle 30 may be pulled upwards to pull the trigger pad 34 against the stapler tool trigger 25 to fire the staple gun remotely. Rotating of the handle 30 to the position shown in FIG. 2 places it in a safety position where the stapler cannot be accidentally fired. A pneumatic hose 35 has a coupler 36 on one end and is attached with a bracket 37 to the elongated arm 11 and has a quick disconnect coupler 38 on the other end thereof where it can be rapidly coupled to the stapler gun 14, as shown in FIGS. 1 and 2. The air line is attached to the handle adapter and the air hose can also be clipped to the operator's belt to avoid tangling in the operator's feet. The hose can be quickly disconnected to remove the fastener tool handle adapter 10 from the pneumatic stapler 14.

Figure 4:
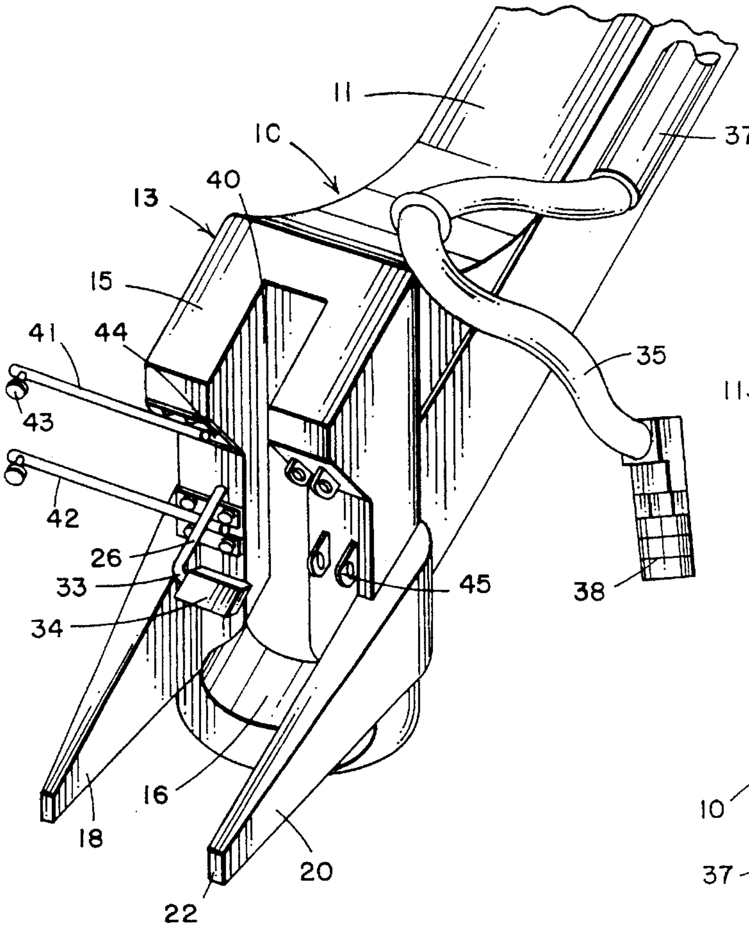
FIG. 4 is a perspective view of the tool attaching portion of the fastener tool handle adapter of FIGS. 1 through 3.

As more clearly seen in FIG. 4, the handle adapter 10 has the elongated handle 11 with the tool attaching portion 13 having the pneumatic hose 35 extending therefrom and supported by the bracket 37 and having the quick disconnect 38 on one end thereof. The tool attaching portion 13 has a housing 15 which forms a handle support area 40 which positions the handle therein for supports on both sides thereof. Two quick attaching latching brackets 41 and 42 are attached to the frame 15, as shown in FIG. 4, and each has a handle 43 on one end thereof and is slid in a sliding bracket portion 44 across the handle opening 40 and into a pair of latching members 45. Each latching member 45 has an aperture therein to allow the sliding rod bracket 41 to slide thereinto to quickly lock the pneumatic stapler 14 to the tool attaching portion 13 of the tool handle adapter 10. FIG. 4 also shows the opening 16 and the legs 18 and 20, each having a foot 22 for positioning and aligning the firing head of the staple gun 14. In addition, the firing pad 30 is supported on the generally perpendicular firing trigger member 33 and can be rotated by the firing arm 26 out of the way of the trigger 25 when attaching or removing the fastener tool handle adapter 10 to the pneumatic stapler or nailer 14 and can be readily maintained in a safety position, as seen in FIG. 2, by the rotation of the trigger firing handle 30. The arm 26 can be rotated to the firing position directly under and adjacent the handle 12, as shown in FIG. 1, so that the firing can take place with the same hand 32 that is holding the handle 12 or it can be separately fired as desired.

It should be clear at this time that a fastener tool handle adapter has been provided for quickly attaching to a pneumatic or electric fastener tool of a type having a firing head and a handle and trigger located adjacent to the handle and which hand adapter can be rapidly attached or removed from a pneumatic stapler or nailer. The fastener tool handle adapter is attached to a staple gun so as not to interfere with the loading and unloading or changing of length of staples or nails while attached to the handle. It should also be clear that a modified handler adapter is required for different makes and shapes of pneumatic staplers and that the adapters can be made inexpensively for rapid attachment and removal. However, it should also be clear that the present invention is not to be considered as limited to the forms shown which are to be considered illustrative rather than restrictive.

I claim:

1. A fastener tool handle adapter removably attachable to a fastener tool of the type having a firing head and a handle and a trigger located adjacent to the handle comprising:

an elongated arm having two ends and having a handle on one end thereof and a fastener tool attaching portion on the other end thereof;

said elongated arm fastener tool attaching portion being shaped to fit over a fastener tool for attachment thereto with a plurality of attaching members and said tool attaching portion having a pair of legs positioned along said fastener tool firing head and shaped to shield said firing head; and a trigger arm rotatably and slidably attached to said elongated arm and having a trigger pull member on one end thereof shaped to rotate beneath the fastener tool trigger by the rotation of said trigger arm and to actuate said fastener tool by sliding said trigger arm and trigger pull member against said fastener tool trigger whereby a fastener tool can be adapted to be operated remotely.

2. A fastener tool handle adapter in accordance with claim 1 in which each of said pair of legs has a positioning and aligning foot on one end thereof for aligning said fastener tool firing head.

3. A fastener tool handle adapter in accordance with claim 2 in which said fastener tool is a pneumatic actuated fastener tool for driving staples.

4. A fastener tool handle adapter in accordance with claim 3 in which said fastener tool handle adapter has an air hose attached to a side of said elongated arm and said air hose has a quick disconnect on one end thereof.

5. A fastener tool handle adapter in accordance with claim 4 in which said fastener tool handle adapter tool attaching portion has an opening therein shaped to fit over said fastener tool firing head.

6. A fastener tool handle adapter in accordance with claim 5 in which said trigger arm includes a rotating and sliding rod having a handle end extending generally perpendicular thereto whereby said trigger arm can be rotated and slid on said elongated arm to fire said fastener tool from adjacent said elongated arm handle.

7. A fastener tool handle adapter in accordance with claim 6 in which said trigger arm is attached to said elongated arm with bracket members.

8. A fastener tool handle adapter in accordance with claim 7 in which said trigger arm has a generally perpendicular trigger member on one end thereof having a fastener tool trigger pad thereon rotatable under said fastener tool trigger in one position and away from said fastener tool trigger is a second position whereby the trigger arm acts as a trigger safety.

9. A fastener tool handle adapter in accordance with claim 8 in which fastener tool handle adapter has said air hose held to said elongated arm with a plurality of bracket members.

* * * * *